United States Patent [19]

Hudak

[11] Patent Number: 4,800,619

[45] Date of Patent: Jan. 31, 1989

[54] WEAR INSERT FOR A DOOR CHANNEL

[75] Inventor: Robert R. Hudak, Columbus, Ga.

[73] Assignee: Douglas & Lomason Company, Farmington Hills, Mich.

[21] Appl. No.: 80,291

[22] Filed: Jul. 31, 1987

[51] Int. Cl.$^4$ .......................................... A47H 15/00
[52] U.S. Cl. .................................. 16/95 R; 16/96 R; 16/102; 16/DIG. 1; 104/106; 238/148; 160/201; 384/55; 384/59; 49/428
[58] Field of Search .................. 16/95 R, 95 W, 95 D, 16/95 DW, 94 R, 94 D, 96 R, 96 D, 96 L, 89, 102, 87.4 R, 87.6, DIG. 1; 104/106, 107, 109, 110, 94, 93, 95, 89, 118; 105/150, 154, 155, 148; 238/148, 122, 129, 143, 145, 146, 10 R; 160/201, 202, 270, 272

[56] References Cited

U.S. PATENT DOCUMENTS 3,628,588 12/1971 Dixon .................................. 16/95 R
4,178,857 12/1979 Madland ............................ 16/96 R
4,219,971 9/1980 Mauroner et al. ..................... 49/425

FOREIGN PATENT DOCUMENTS 1164045 2/1964 Fed. Rep. of Germany ..... 16/96 D
844845 8/1960 United Kingdom ............... 16/96 D

OTHER PUBLICATIONS

*Beverage Industry*, advertisement, Hackney & Sons, Inc.

Primary Examiner—Richard K. Seidel
Attorney, Agent, or Firm—Harness, Dickey & Pierce

[57] ABSTRACT

A wear resistant track for the rollers of an overhead door to roll against includes a pair of uniform longitudinally extruded members such as an insert and a channel and locking means for releasably interlocking the members together whereby a planar surface of the insert is flush with portions of the channel and positioned for the rollers to bear against. In one arrangement the insert was of a polymer such as nylon and the channel was of aluminum.

30 Claims, 2 Drawing Sheets

U.S. Patent   Jan. 31, 1989   Sheet 1 of 2   4,800,619
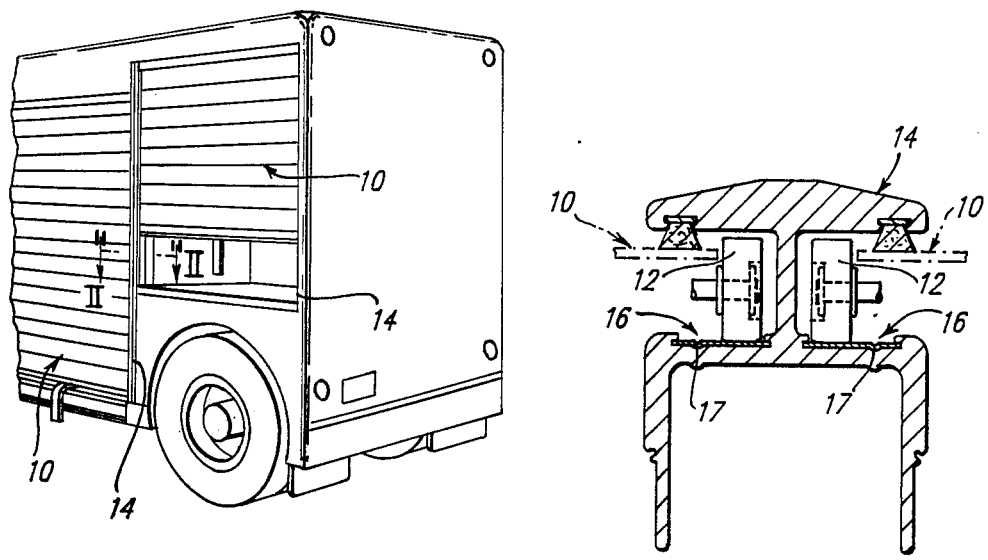
Prior Art
FIG. 1.
FIG. 2.
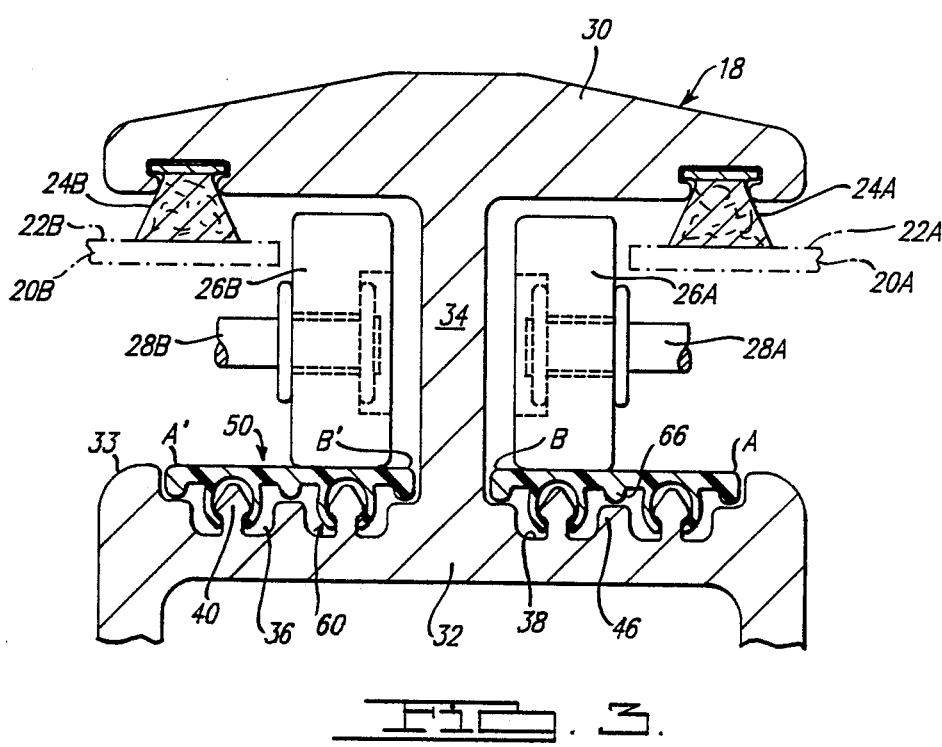
FIG. 3.

WEAR INSERT FOR A DOOR CHANNEL

This invention relates to an insert for a door channel and more particularly to a wear insert removably mounted in the track of a beverage truck to increase wear resistance of the track.

Beverage trucks, such as shown in FIG. 1, typically include on each side a pair of doors 10 having articulated longitudinal panels and supported on rollers that roll in channels 14 extending vertically upward from the base of the truck to expose the inside of the truck. Driving motion of the truck places aerodynamic and inertia loads on the doors causing the rollers to rattle both transversely to and along the axis of the vehicle. The transverse motion places vibration loads on the channel, the truck and securements such as welds. Axial vibrating movement of the rollers along the axis of truck movement, which is also the axis for the roller axle, causes the rollers to unnecessarily rub against the channel. This oscillating rubbing causes a small portion of the channel to wear out prematurely. The channel, which is typically made of aluminum to reduce weight, is relatively soft and thus prone to wear, and is expensive to replace.

A prior art approach that addresses this problem is illustrated in FIG. 2. In FIG. 2 a stainless steel strip 16 is inserted endwise into a recess formed between lateral ribs of the channel extruded of aluminum. The stainless steel strip is held in place by striking surface of the strip with a punch with a sufficient force to permanently distort the strip and the aluminum surface at 17. This distortion makes the strip unable to slide. While the metal strip does not wear, the aluminum surface is very thin and after a time the metal strip 16 and the aluminum backing surface are indented by the force of the roller 12 hitting against the two. The results are the same as the wear, a pitted F region. In addition, problems of electrolytic corrosion are introduced by the dissimilar metals. Further, replacement of a worn insert is not possible because of the deformation process.

The general object of this invention is reduction of unnecessary wear on expensive metal channels by provision of an inexpensive insert which is easy to install, and repositionable in the field. In addition, use of a nonmetal insert comprised of nylon instead of stainless steel eliminates galvanic corrosion between dissimilar metals.

The foregoing objects and advantages will become more apparent when viewed in light of the accompanying drawings and following detailed description wherein:

FIG. 1 shows a prior art beverage truck having a pair of side doors mounted on rollers for overhead movement in vertical channels.

FIG. 2 is section view taken along lines II—II of FIG. 1 of the side doors rollably disposed in the channel.

FIG. 3 is a section view of a channel having a wear insert in accord with the invention.

Figure 4:
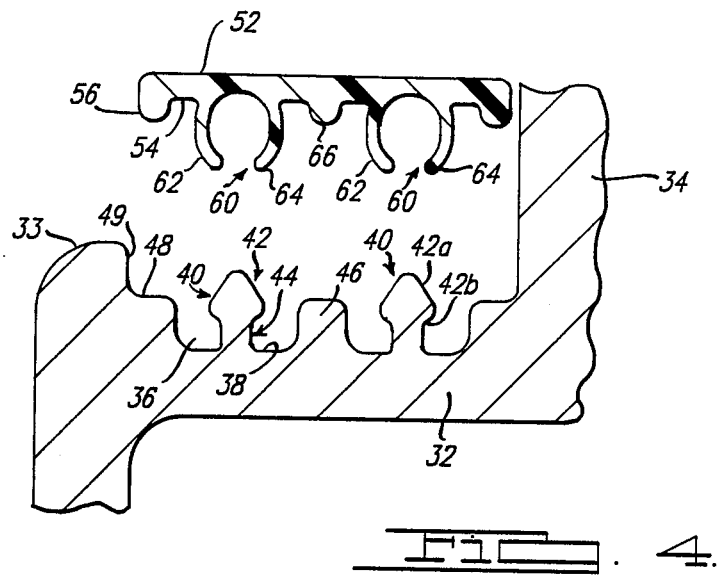
FIG. 4 is a section view of the wear insert spaced from the channel.

Turning now to the drawings, FIG. 3 shows a wear resistant track assembly 18 for a pair of side-by-side articulated doors—20A, 20B (shown in phantom) each supported on axles 28A, 28B rollably connected to rollers 26A, 26B and movable in and along the track. As shown, the track is generally I-shaped in section and includes an upper flange 30, a lower flange 32 having a lateral edge surface 33, and a partition 34 extending perpendicularly between the flanges. The doors 20A, 20B each have a moisture guard 24A, 24B captivated in the upper flange to engage the outer surface 22A, 22B of their associated door. The mounting of door 20A at its other end would appear like that shown for door 20B and door 20B at its other end would appear like that shown for door 20A.

In accord with the present invention, the lower flange on each side of the partition has been extruded to include a pair of shaped ribs 36 and grooves 38 extending upwardly from a recessed base 37 and longitudinally along the track and specially configured to receive a wear insert 50. As shown the wear insert cooperates with the track to define smooth flush surface 54 for the rollers to bear against and is recessed. The track 18 is preferably extruded from an aluminum such as 6061-T6. Stops at the top and bottom of the track are preferably provided to inhibit vertical movement of the insert.

FIG. 4 shows the wear insert 40 positioned above the track for downward mounting insertion therein. Since the track is symmetrical only one side will be described. The track includes a plurality of parallel elongated and laterally spaced ribs 40 which define a corresponding plurality of elongated grooves or shallow recesses 44 between the ribs, two of the ribs including a diamond shaped head 42. A medial rib 46 is provided as an anvil or support for limiting movement of the insert. A pair of recessed ledges 48 are adjacent to sidewalls 49 and provided to support the lateral edges of the insert as well as to limit the inward insertion.

The wear insert 50 has top and bottom surfaces 52, 54, a pair of laterally spaced longitudinally extending edges 56, 58 each adapted to seat on one of the ledges, a pair of locking members 60 each including a pair of arcuate flexible flanges 62, 64 each extending upwardly from the bottom surface to terminate in free ends 63, 65 and a medial rib 66 adapted to engage the anvil 46. Each locking member 60 is adapted to interlockingly engage with one of the shaped heads.

Preferably the insert is comprised of a tough yet relatively inexpensive polymer such as nylon. Use of such a nonmetallic material obviates potential electrolytic action between the insert and track, is "harder" than aluminum, is flexible enough to allow snap-in installation, and is relatively inexpensive without a sacrifice in function. In the preferred embodiment, the insert 50 is amde from DuPont Zytel ST-901, a super tough resin having amorphour characteristics, is non-brittle and has good extrusion properties.

The heads 42 are generally diamond-shaped and defined by a forward first pair of angled surfaces 42a and a rearward second pair of angled surfaces 42b. The first and second pairs of angled surfaces 42a and 42b defined opposite corners of the diamond shape with the apex of each corner being connected by an imaginary line "I" (see FIG. 5) therethrough and through the body 44. The first pair of surfaces 42a defines a cam A (see FIG. 5) which spreads the arcuate flanges 62, 64 laterally to allow downward snap-fitting of the flanges about the head and the second pair of surfaces 42b define a cam "B" (see FIG. 5) which spreads the arcuate flanges to allow removal. Relative to the imaginary line "I", the first cam is defined by an included angle of about 65°–75° and the second cam is defined by an included angle of about 100°–120°.

Figures 5, 6, 7:
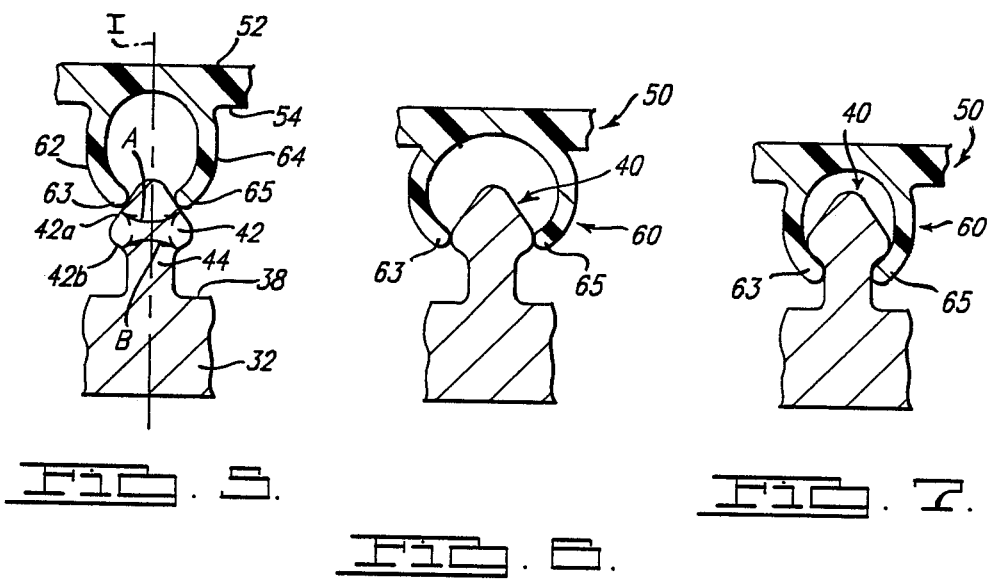
FIGS. 5, 6 and 7 are section views showing the wear insert being installed in the channel.

FIGS. 5, 6 and 7 show interlocking of the insert 50 by a downward insertion of the insert into the track whereby each respective pair of flanges 62, 64 engagingly interlocks with one of the shaped heads 42. The stop surfaces in the track provided by the anvil 46 and rib 66 in the insert 50 limits how far down the insert will go when snapped downwardly into the channel. Because of the recessed fit, after installation the wear strip has its planar top surface 52 flush with the edge of the aluminum post allowing smooth operation of the doors.

Additionally, it will be appreciated that the design of the present invention facilitates convenient repair and/or replacement of the insert 50 in the field. In particular, it will be noted that the present wear insert is configured so that the right and left halves of the insert, relative to its longitudinal axis, are equivalent to each other. Accordingly, once worn, the insert is adapted to be easily pried upwardly from the track and its opposite ends juxtaposed so as to present a fresh wear surface to the rollers. As indicated in FIG. 3, letters A and B and A' and B' represent like lateral edge portions of a first and a second insert. If the first insert to the right of partition 34 has worn adjacent edge B where the wheel has rested, the first insert can have its opposite longitudinal ends juxtaposed so that the lateral edge A is now adjacent the partition and the worn edge B is spaced from the partition. In like manner the first insert can be translated to the left of partition 34 such that its fresh lateral edge A is adjacent the partition and the second insert translated to right of the partition such that its fresh lateral edge A' is adjacent the partition. An important benefit of this feature of the present invention is that it essentially doubles the useful life of the wear insert.

Further, while shown being installed downwardly, the symmetrical nature of the insert 50 and track 18 is such that endwise insertion of the insert is possible if required by a particular application.

While the above description constitutes the preferred embodiment, it will be appreciated that the present invention is susceptible to modification and change without departing from the fair meaning or proper scope of the accompanying claims.

What is claimed is:

1. A wear resistant track for the rollers of an overhead door to bear against, characterized by a pair of uniform longitudinally extending members including a nonmetal insert and a metal channel, and locking means for releasably interlocking the members together whereby a planar surface of the insert is positioned for the roller to bear against, said channel including a pair of laterally spaced upstanding sidewalls, said nonmetal insert having a lateral width configured to fit snugly between the sidewalls upon a downward movement into the channel, and said locking means including an upstanding longitudinal rib on one member being configured to removably interlock within a longitudinal groove in the other member, said groove being defined by a pair of longitudinally extending arcuate flanges configured to receive the rib inserted therebetween.

2. The wear resistant track as recited in claim 1 wherein said insert has a top and bottom surface the top surface being said planar surface and the bottom surface including said longitudinal rib.

3. The wear resistant track as recited in claim 2 wherein said insert includes, a pair of ribs and said channel includes a pair of grooves each positioned so as to removably interlock with one another when the insert is moved downwardly into said channel.

4. The wear resistant track as recited in claim 2 wherein said channel includes a planar upper surface and each said sidewall defines a longitudinally extending ledge inwardly from the upper surface and adjacent of its respective sidewall, downward insertion of the insert disposing the top surface thereof to be substantially flush with the upper surface.

5. The wear resistant track as recited in claim 1 including support means disposed between said members for limiting downward movement of said insert into said channel.

6. The wear resistant track as recited in claim 5 wherein said support means includes a longtitudinally extending anvil extending upwardly from one said channel and insert.

7. The wear resistant track as recited in claim 1 wherein said locking means comprises two pairs of longitudinally extending arcuate flanges and a pair of longitudinally extending ribs each having an enlarged head, each pair of flanges having laterally deflectable free ends defining an opening to receive and engage the head of one respective rib, the flanges extending from the insert and adapted to releasably interlock the ribs extending from the channel upon a downward movement of the insert against the channel.

8. The wear resistant track as recited in claim 7 wherein a shoulder is disposed between the resepcted pairs of flanges and an anvil is disposed between the ribs, said shoulder and anvil being positioned and sized to engage one another whereby to limit downward insertion of the insert into the channel.

9. The wear resistant track as recited in claim 1 including two uniform longitudinally extending inserts and two channels, each pair of channels being disposed in side by side relation, and locking means for interlocking one of said inserts in each said channel whereby a planar surface of each said insert is positioned for the rollers of adjacent doors to bear against.

10. The wear resistant track as recited in claim 9 wherein each said insert is releasably interlockable in either said channel.

11. The wear resistant track as recited in claim 10 wherein each said insert has a first and a second end and each said channel has a bottom end and a top end, the first end of each said insert being positionable adjacen the top or the bottom end of either said channel.

12. A wear resistant track for the rollers connected to an overhead door to roll on, characterized by a metal channel having a pair of sidewalls and a center rib each extending longitudinally along and upwardly from a base thereof to define a pair of longitudinal grooves, and a nonmetal insert having a top and bottom surface and configured to fit snugly between said sidewalls, said top surface being for the rollers to bear against and said bottom surface including a central longitudinal groove configured to removably receive said rib whereby to interlock the insert within the channel.

13. The wear resistant track as recited in claim 12 wherein the rib has an enlarged head and a narrow body, the groove is formed by a pair of arcuate flexible flanges each curving upwardly and inwardly towards one another to form with their free ends a narrowed constriction which spreads laterally to receive the head thrust therebetween.

14. The wear resistant track as recited in claim 13 wherein the enlarged head forms a generally diamond-shaped cross-section with an imaginary line between the two opposite acutely angled corners of the diamond extending through the body and being generally perpendicular to said base, each acutely angled corner forming a cam for speading the fingers apart one cam for entry and the other cam for removal, the fingers grippingly seating against the body along a line adjacent said other cam.

15. The wear resistant track as recited in claim 12 wherein two pairs of longitudinal grooves and corresponding ribs are on the insert and channel, respectively, each being positioned to be removably interlocked with one another when the insert is connected to the track.

16. The wear resistant track as recited in claim 15 wherein one sidewall terminates in an upper face substantially minates in an upper face substantially coplanar with the top surface of the insert.

17. The wear resistant track assembly as recited in claim 15 wherein the insert and channel are formed by an extrusion process.

18. An insert for a metal track, said track being configured to receive the rollers of an overhead door and comprising a central rib and a pair of sidewalls each extending longitudinally, characterized by said insert being formed of a nonmetal material including a base having a pair of sidewalls, an upper surface for the rollers to bear against when the door is moved, a lower surface having a pair of laterally flexible arcuate flanges extending therefrom and configured to interlock with said rib, and support means for limiting movement of the insert towards the channel, the flanges each terminating in a free end which flexes laterally upon receipt of said rib.

19. A wear resistant track assembly for a beverage truck having an articulate door that is supported on rollers and vertically movable to expose an opening on one side of the truck, characterized by a pair of elongated metal channels each extending vertically from the truck frame and having between lateral sidewalls a plurality of parallel elongated and laterally spaced ribs and recesses, and a pair of elongated nonmetal inserts each being configured to snugly interlock with and be releasably retained by the spaced ribs in each channel, a planar surface of the insert and said channel being generally coplanar and parallel to the axis of said rollers when the insert is connected to the channel.

20. The wear resistant track assembly as recited in claim 19 wherein said truck includes a pair of doors disposed in side-by-side relation with the channel between each pair of doors being I-shaped and having a partition for separating a pair of like configured inserts one insert, being interlockable with respective ribs on each side of the partition, the insert on each side receiving the rollers from the lateral end of one respective side-by-side door.

21. The wear resistant track assembly as recited in claim 19 wherein each insert has a first end and a second end, the channel has a top end and a bottom end, and the inserts are configured alike such that the inserts may be exchanged with one another and also that the inserts may have their first ends disposed either adjacent the top end or the bottom end of its channel or interposed with the other insert.

22. The wear resistant track assembly as recited in claim 21 wherein each said insert is comprised of a tough polymer such as nylon.

23. In combination, an elongated track mounted on a movable vehicle including a vertically opening overhead door having rollers supported on said track, the improvement characterized by said track including a channel of uniform cross-section and having a pair of ribs and a recess for receiving an elongated wear strip of uniform cross-section inserted downwardly into the channel, said wear strip including means for interlocking with said ribs when inserted into said recess.

24. The invention as recited in claim 23 wherein said strip is configured to provide a flat upper surface for the rollers to bear against and each said rib extends generally perpendicularly to the channel and said lock means comprise a pair of laterally deflectable lock beams extending generally perpendicularly downward from the strip to releasably engage said ribs.

25. The invention as recited in claim 24 wherein each said rib has a shaped head, and two pairs of like lock beams extend from the strip to interlock about one respective shaped head.

26. In a beverage truck having a pair of doors on each side, each door having articulated longitudinal panels and supported on rollers that roll in channels extending vertically from the base of the truck to expose the inside of the truck, each said channel being extruded from metal and having an upper and a lower flange and a partition extending between the flanges, the upper flange being outwardly from the truck to cover the top of the rollers and the lower flange being inwardly towards the truck to define a surface for the rollers to roll on, said channels characterized by said lower flange describing a longitudinally extending recess including a longitudinally extending cam extending upwardly therefrom and a nonmetal insert removably mounted in the recess, said insert having a top and a bottom surface and a pair of longitudinally extending laterally deflectable arms extending from the bottom surface to free ends, the arms defining a constriction to hold the head when the insert is snap-fit downwardly into the recess, the top surface being positioned for the rollers to roll on.

27. The beverage truck as recited in claim 26 wherein a pair of longitudinally extending laterally spaced cams extend upwardly from the recess and two pairs of longitudinally extending laterally deflectable arms extend from said insert, each pair of arms being positioned to engage one respective cam.

28. The beverage truck as recited in claim 27 including support means extending between the respective insert and recess for limiting insertion of the insert and supporting the insert in the recess.

29. The beverage truck as recited in claim 26 wherein three channels are side-by-side to support the two doors on one said side, two said channels being outermost to receive the rollers from one and the other door and one channel being intermediate the other two channels to receive the rollers from both doors, said one channel is I-shaped in cross-section to define a pair of C-shaped chambers each chamber receiving the rollers from one and the other door, the upper flange covering the top of the respective rollers and the lower flange defining surfaces for the respective rollers to roll on, each lower flange receiving a like-shaped nonmetal insert.

30. The beverage truck as recited in claim 29 wherein the nonmetal insert is interfittable in any channel and configured such that its ends if juxtaposed allow reversing fitment in its channel and in the other channels.

* * * * *

UNITED STATES PATENT AND TRADEMARK OFFICE
CERTIFICATE OF CORRECTION

PATENT NO. : 4,800,619

DATED : January 31, 1989

INVENTOR(S) : Robert R. Hudak

It is certified that error appears in the above-identified patent and that said Letters Patent is hereby corrected as shown below:

Column 1, line 60, "the" should be --this--.

Column 2, line 52, "amde" should be --made--.

Column 2, line 53, "amorphour" should be --amorphous--.

Column 2, line 58, "defined" should be --define--.

Column 4, line 49, claim 11, "adjacen" should be --adjacent--.

Column 5, line 39, claim 19, "articulate" should be --articulated--.

Column 5, lines 56-57, claim 20, delete "," after --insert-- and insert "," after --inserts--.

Signed and Sealed this

Twenty-fourth Day of October, 1989

Attest:

DONALD J. QUIGG

*Attesting Officer*

*Commissioner of Patents and Trademarks*